US007672373B2

(12) United States Patent
Toebes et al.

(10) Patent No.: US 7,672,373 B2
(45) Date of Patent: Mar. 2, 2010

(54) DIGITAL WATERMARKING OF A MEDIA STREAM USING CODED MACROBLOCK TYPES

(75) Inventors: John A. Toebes, Cary, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1360 days.

(21) Appl. No.: 11/104,131

(22) Filed: Apr. 11, 2005

(65) Prior Publication Data

US 2006/0227873 A1    Oct. 12, 2006

(51) Int. Cl.
*H04B 1/66* (2006.01)
(52) U.S. Cl. ............................. 375/240.12; 375/240.15; 375/240.16; 375/240.14; 375/240.26; 382/235; 382/238; 713/176; 713/168; 380/217; 380/216; 380/210
(58) Field of Classification Search ............. 375/240.12, 375/240.15, 240.16, 240.14, 240.26; 713/176, 713/168; 380/217, 216, 210; 382/235, 238
See application file for complete search history.

(56) References Cited

U.S. PATENT DOCUMENTS 5,960,081 A * 9/1999 Vynne et al. ................ 713/176
6,381,341 B1   4/2002 Rhoads ........................ 382/100
6,798,893 B1 * 9/2004 Tanaka ........................ 382/100

OTHER PUBLICATIONS

"Digital Watermarking Frequently Asked Questions (FAQ)," Puidoux, Switzerland, Oct. 14, 2001. Downloaded Apr. 5, 2004 from watermarkingworld.org. Available online at http://www.watermarkingworld.org/faq.html.
O.D. Escoda, R.M. Figueras i Ventura, E. Debes and T. Ebrahimi, "Influence of a Large Image Watermarking Scheme Parallelization on Possible Attacks" in proceedings of the SPIE's Annual Meeting on Optical Science and Technology, San Diego, California, Jul.-Aug. 2001. Available online at http://www.eric.debes.net/SPIEWMAttacks.pdf.
"Research on Digital Watermarking at Aristotle University of Thessaloniki," Nov. 1997. Available from Aristotle University of Thessaloniki, Thessaloniki, Greece. Also available online at http://poseidon.csd.auth.gr/signatures/report.html.
S. Mohanty, "Digital Watermarking: A Tutorial Review", Department of Computer Science, University of South Florida, Tampa, Florida. Prepared in 1999 at the Indian Institute of Technology, Bangalore, India. Available online at http://citeseer.ist.psu.edu/mohanty99digital.html.

*Primary Examiner*—Shawn An
(74) *Attorney, Agent, or Firm*—Dov Rosenfeld; Inventek (57) ABSTRACT

A method and a carrier medium instructing a processor to execute a method. The method includes accepting a compressed video stream compressed by a compression method that uses macroblocks of possibly different macroblock types for each frame predictive encoding frames. The method further includes identifying a sequence of frames that are substantially visually indistinguishable and that include a predictively encoded frame and the at least one reference frame of the predictively encoded frame. The method further includes creating an ordered set of macroblocks, with the macroblock types of different macroblocks in the ordered set used to encode digital watermark information. The method further includes replacing the predictively encoded frame of the identified sequence with a newly-encoded predictively encoded replacement frame that contains the created ordered set of macroblocks, including the encoded watermarking information.

14 Claims, 6 Drawing Sheets

OTHER PUBLICATIONS

M. Wu and B. Liu, "Date Hiding in Image and Video: Part I Fundamental Issues and Solutions," IEEE Transactions on Image Processing, vol. 12, No. 6, Jun. 2003, pp. 685-695.

F. Hartung and M. Kutter, "Multimedia Watermarking Techniques," Proceedings of the IEEE, vol. 87, No. 7, Jul. 1999, pp. 1079-1107.

B. Yann, L. Nathalie and D. Jean-Luc, Abstract of "A Scrambling Method Based on Disturbance of Motion Vector," Proceedings of the tenth ACM International Conference on Multimedia, 2002, pp. 89-90.

* cited by examiner

FIG. 1

| B-frame type is Bidirectional/Not Coded | |
|---|---|
| Total 6 bit | 101111 |
|  | Meaning |
| 10 | macroblock_type |
| 1 | motion_horizontal_forward_code |
| 1 | motion_vertical_forward_code |
| 1 | motion_horizontal_backward_code |
| 1 | motion_vertical_backward_code |

FIG. 2A

| B-frame type is Bidirectional/Coded | |
|---|---|
| Total 14-bit bitstring code is: | 11111111011010 |
| Substring | Meaning |
| 11 | macroblock_type |
| 1 | motion_horizontal_forward_code |
| 1 | motion_vertical_forward_code |
| 1 | motion_horizontal_backward_code |
| 1 | motion_vertical_backward_code |
| 1101 | coded_block_pattern_4 |
| 10 | dct_coeff_first (end_of_block) |
| 10 | dct_coeff_next (end_of_block) |

FIG. 2B

| B-frame type is Backward/Not Coded ||
|---|---|
| Total 5-bit bitstring code is: | 01011 |
| Substring | Meaning |
| 010 | macroblock_type |
| 1 | motion_horizontal_backward_code |
| 1 | motion_vertical_backward_code |

FIG. 2C

| B-frame type is Backward/Coded ||
|---|---|
| Total 13-bit bitstring code is: | 0111111011010 |
| Substring | Meaning |
| 011 | macroblock_type |
| 1 | motion_horizontal_backward_code |
| 1 | motion_vertical_backward_code |
| 1101 | coded_block_pattern_4 |
| 10 | dct_coeff_first (end_of_block) |
| 10 | dct_coeff_next (end_of_block) |

FIG. 2D

| B-frame type is Forward/Not Coded | |
|---|---|
| Total 6-bit bitstring code is: | 001011 |
| Substring | Meaning |
| 0010 | macroblock_type |
| 1 | motion_horizontal_forward_code |
| 1 | motion_vertical_forward_code |

FIG. 2E

| B-frame type is Forward/Coded | |
|---|---|
| Total 14-bit bitstring code is | 00111111011010 |
| Substring | Meaning |
| 0011 | macroblock_type |
| 1 | motion_horizontal_forward_code |
| 1 | motion_vertical_forward_code |
| 1101 | coded_block_pattern_4 |
| 10 | dct_coeff_first (end_of_block) |
| 10 | dct_coeff_next (end_of_block) |

FIG. 2F

| B-frame type is Bidir/Coded/Quant | |
|---|---|
| Total 22-bit bitstring code is | 0001000001111111011010 |
| Substring | Meaning |
| 00010 | macroblock_type |
| 00001 | quantizer_scale |
| 1 | motion_horizontal_forward_code |
| 1 | motion_vertical_forward_code |
| 1 | motion_horizontal_backward_code |
| 1 | motion_vertical_backward_code |
| 1101 | coded_block_pattern 4 |
| 10 | dct_coeff_first (end_of_block) |
| 10 | dct_coeff_next (end_of_block) |

FIG. 2G

| B-frame type is Forward/Coded/Quant | |
|---|---|
| Total 21-bit bitstring code is | 000011000011111011010 |
| Substring | Meaning |
| 000011 | macroblock_type |
| 00001 | quantizer_scale |
| 1 | motion_horizontal_forward_code |
| 1 | motion_vertical_forward_code |
| 1101 | coded_block_pattern |
| 10 | dct_coeff_first (end_of_block) |
| 10 | dct_coeff_next (end_of_block) |

FIG. 2H

| | |
|---|---|
| B-frame type is Backward/Coded/Quant | |
| Total 21-bit bitstring code is | 000011000011111011010 |
| Substring | Meaning |
| 000011 | macroblock_type |
| 00001 | quantizer_scale |
| 1 | motion_horizontal_backward_code |
| 1 | motion_vertical_backward_code |
| 1101 | coded_block_pattern 4 |
| 10 | dct_coeff_first (end_of_block) |
| 10 | dct_coeff_next (end_of_block) |

FIG. 21

DIGITAL WATERMARKING OF A MEDIA STREAM USING CODED MACROBLOCK TYPES

BACKGROUND

The present invention relates to digitally watermarking media, and in particular, to digitally watermark a compressed video stream such as a MPEG stream.

When delivering digital media, it is highly desirable to the content owner to be able to digitally mark ("watermark") each copy of the digital media to identify the origin of the content, e.g., in order to track down and discourage copiers.

Many standards are known for coding multimedia streams such as video streams. Common transform coding methods, such as Motion JPEG, MPEG1, MPEG2, ITU-T-261, etc., encode as follows. For motion video, an image is divided into blocks, e.g., 8 by 8 or 16 by 16 groups of pixels. Each image is classified as interframe or intraframe. Motion estimation determines a set of frame-to-frame motion vectors, and for interframe coding, images are typically motion compensated according to the determined motion vectors. Interframe images are formed post-motion compensation. The blocks of the image are transformed, e.g., by a discrete cosine transform (DCT), and the transform coefficients of the block are quantized, e.g., such that some higher frequency components are quantized to zero. The quantized transform coefficients of each block are then coded along a specified path according to a variable length coding. The DC component is typically separately encoded. Newer transform coding techniques include the H.264/MEG-4 AVC video coding standard/draft standard that defines 4×4 blocks and a DCT-like 4×4 integer transform.

It is known to use MPEG encoding techniques to encode a watermark or other identifying information in a video stream. Such known attempts fall into three basic categories:

(1) Modification of existing images to encode watermark data, e.g., into the high frequency regions of motion vectors such that there is no significant perceptible visual degradation of the image.

(2) Modification of existing motion vectors to degrade the image in such a method that the watermark is barely perceptible, but cannot be viewed without a secondary program to undo the watermarking (3) Modification of a random-like, but known portion of the media stream, producing degradation of portions of the images.

Such prior art methods are discussed in various references. One good source is the Watermarking FAQ, available on the Web at http://www.watermarkingworld.org/faq.html.

For example, Bodo Yann, Nathalie Laurent, Jean-Luc Dugelay: A scrambling method based on disturbance of motion vector, Proceedings, ACM Multimedia 2002, pp. 89-90, Juan les Pins, France describes a method in which video data are scrambled efficiently by disturbing a subset of motion vectors. The interest of this approach is its ability to scramble a video while maintaining a certain visibility. Effectively it permits the use of considerable levels of security in order to choose the level of perceptibility of the video.

Several prior art methods also are mentioned in "Research on digital watermarking at Aristotle University of Thessaloniki, November 1997" available from Aristotle University of Thessaloniki, Thessaloniki, Greece, Also at http://poseidon.csd.auth.gr/signatures/report.html See also Oscar Divorra Escoda, Rosa Maria Figueras i Ventura, Eric Debes, Touradj Ebrahimi, "Influence of a Large Image Watermarking Scheme Parallelization on Possible Attacks" in proceedings of the SPIE's Annual Meeting on Optical Science and Technology, San Diego, Calif., July-August 2001. Available at http://www.eric.debes.net/SPIEW-MAttacks.pdf U.S. Pat. No. 5,960,081 to Vynne, et al., titled EMBEDDING A DIGITAL SIGNATURE IN A VIDEO SEQUENCE describes embedding a digital signature into the x- and y-coordinates of motion vectors.

See also U.S. Pat. No. 6,381,341 to Rhoads titled WATERMARK ENCODING METHOD EXPLOITING BIASES INHERENT IN ORIGINAL SIGNAL.

A good survey article is F. Hartung, M. Kutter: "Multimedia Watermarking Techniques", Proc. of IEEE, pp. 1079-1107, July, 1999.

A tutorial introduction to the overall field of watermarking is S. Mohanty, Digital Watermarking: A Tutorial Review, Department of Computer Science, University of South Florida, Tampa, Fla. 33620. Prepared in 1999 at the Indian Institute of Technology, Bangalore, India. Available on the Web at http://www.csee.usf.edu/~smohanty/research/Reports/WMSurvey1999Mohanty.pdf, and also at http://citeseer.ist.psu.edu/mohanty99digital.html.

See also M. Wu and B. Liu, "Date Hiding in Image and Video, Part I Fundamental Issues and Solutions", IEEE Trans Image Processing, June 2003, pp 685-695.

Even though there is much prior art in the field, there still is a need in the art for a method of watermarking a media stream that does not require wholesale re-encoding of the content. There further is still a need in the art for a method that does not (substantially) affect the size of the content. There still is a need in the art for a method that is difficult to detect by a consumer. There also is still a need in the art for a media digital watermarking method that does not affect the content presentation at all. For example, there is a need in the art for a method applicable to MPEG streams that results in a watermarked stream that is a valid MPEG stream that looks (and sounds) identical to the original stream being watermarked. There further is still a need in the art for a method that can be implemented with relatively low overhead, e.g., by a content distributor, so that such a content provider can add a distinguishing digital "watermark" without undue processing time.

SUMMARY

Described herein are a method and a carrier medium instructing a processor to execute a method. The method includes accepting a compressed video stream compressed by a compression method that uses macroblocks of possibly different macroblock types for each frame of predictive encoding frames. The method further includes identifying a sequence of frames, or portions of a sequence of frames, that are substantially visually indistinguishable and that include a predictively encoded frame and the reference frames djw: note: for B frames, both the forward and backward predictive frames need to be in the sequence of the predictively encoded frame. The method further includes creating an ordered set of macroblocks, with the macroblock types of different macroblocks in the ordered set used to encode digital watermark information. The method further includes replacing the predictively encoded frame of the identified sequence with a newly-encoded predictively encoded replacement frame that contains the created ordered set of macroblocks, including the encoded watermarking information. The new encoding of the replacement frame is such that the size of the newly-encoded replacement frame has the same size in bits as the predictively encoded frame being replaced.

DETAILED DESCRIPTION

Described herein is a method for including digital watermark information in a media stream encoded by an encoding method that includes the option of forward/backward interpolated temporal prediction.

The description is provided herein in terms of the MPEG coding method, e.g., MPEG1 and MPEG2 for video information. Such video encoding methods use reference frames (I-frames) that are compressed independent of any other frame, and P-frames that are predictively encoded with reference to the most recent past frame, which may be an I-frame or a P-frame, called the reference frame to the predictively encoded frame. MPEG also has the option of using predictively encoded frames that use combined forward/backward interpolated prediction. Such frames are commonly referred to as bi-directional interpolated predictively encoded frames, bi-directional interpolated prediction frames, or B-frames. As an example of the use of I-, P-, and B-frames, consider the following groups of pictures: I1, B2, B3, P4, B5, B6, P7, B8, B9, I10, B11, . . . I-frames are coded spatially only and each P-frame is forward predicted based on the previous I- or P-frame. The B-frames however, are predictively encoded based on a forward prediction from a previous I- or P-frame, as well as a backward prediction from a succeeding I-or P-frame. As such, the example sequence is processed by a MPEG encoder such that each of the first and second B-frames B2 and B3 is predicted from the first I-frame I1 and the first P-frame P4, each of the third and fourth B-frames B5 and B6 is predicted from the second and third P-frames P4 and P7, respectively, and each of the fifth and sixth B-frames B8 and B9 is predicted from the third P-frame P7 and the first I-frame I10 of the next group of pictures. For backward "prediction" to occur, the future frames that are to be used for backward prediction are encoded and transmitted first, out of order.

B-frames are also called bidirectionally-interpolated frames. The two frames used in the forward/backward prediction are called the key frames, and also the reference frames. The reference frames may be I- or P-frames.

The reader is assumed to be familiar with the MPEG2 standard, and with terminology used therein. See, for example, "INTERNATIONAL ORGANISATION FOR STANDARDISATION Standard ISO/IEC 13818-2:2000 Information technology—Generic coding of moving pictures and associated audio information: Video".

In MPEG2, for example, an image is divided into 16 by 16 macroblocks, and then the macroblocks are further divided into four 8 by 8 luminance blocks, and two 8 by 8 chrominance blocks, one for each chrominance coordinate. Each macroblock for a different type of frame, e.g., for a I-, P-, or B-frame, is further classified into a block type according to how that block is encoded. There are seven different coded macroblock types in a P-frame, plus a "skip" type when the P-frame macroblock is substantially identical to the same macroblock in the previous frame for a total of 8 P-frame macroblock types. There also are 11 coded B-frame macroblock types, as well as a skip type for a total of 12 B-frame macroblock types. The type of macroblock indicates, e.g., which macroblock is to be encoded using intra-coding (for B-frames and P-frames), forward prediction (for P-frames and B-frames), interpolation (for B-frames) or backward prediction (for B-frames). Then which are to be motion compensated (for B- and P-frames). Also which are to have additional DCT-encoded data present (for B- and P-frames). Also which are to have changed quantizer scales (for B- and P-frames).

Figure 1:
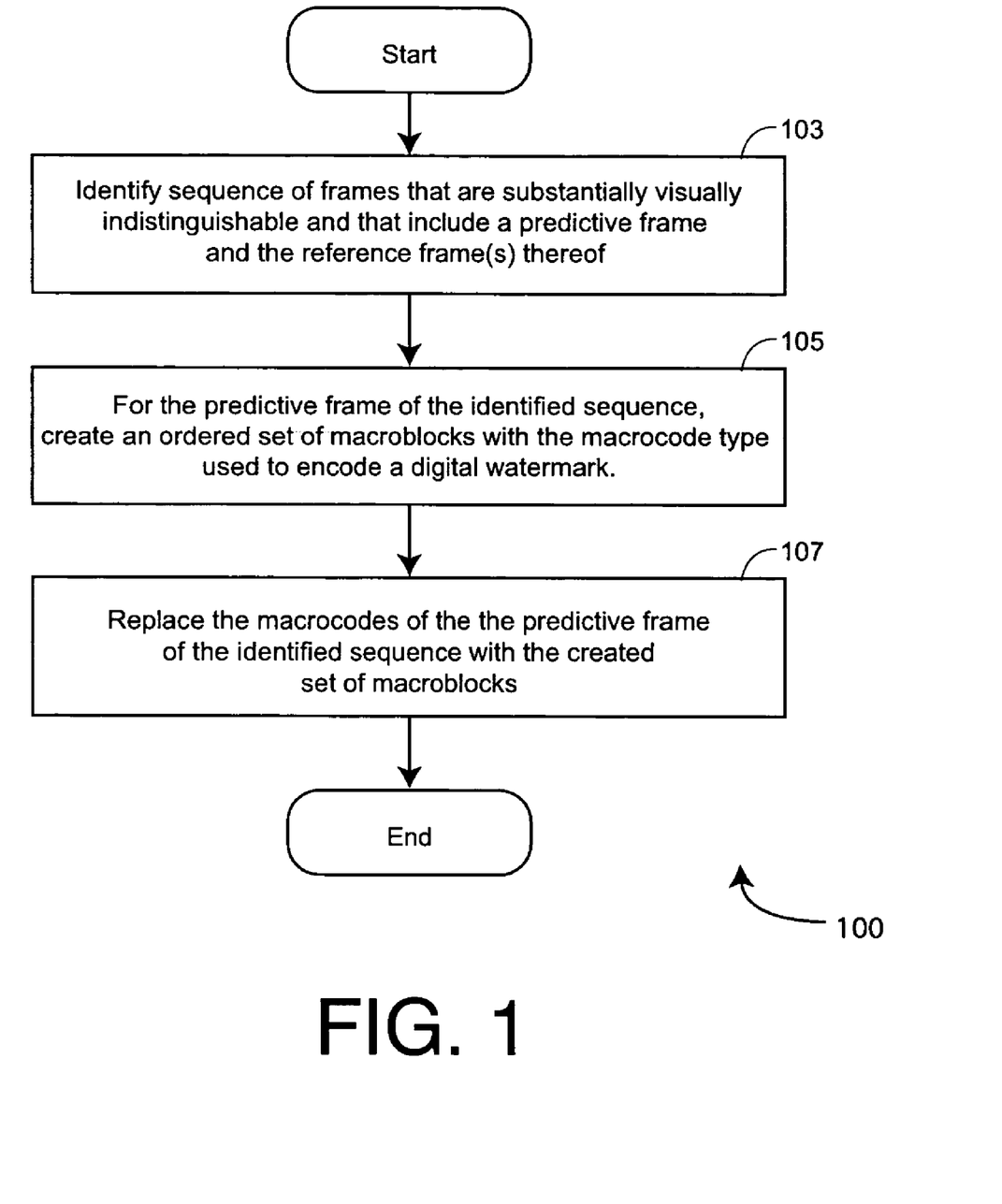
FIG. 1 shows a simplified flowchart of a method embodiment of the invention.

FIG. 1 shows a flowchart of one embodiment of a method 100 of encoding a digital watermark into the video stream of a media stream. An MPEG2 stream is assumed, although the invention is not restricted to MPEG. The method 100 includes accepting a compressed video stream. The method further includes, in 103, identifying a sequence of frames that are substantially visually indistinguishable and that include a predictively encoded frame and the reference frame(s) of the predictively encoded frame.

In one embodiment, 103 includes identifying a sequence of frames that are identical or near-identical frames of MPEG2 video that includes at least one B-frame and the B-frame's predecessor and successor reference frames. By identical or near identical is meant that the images of the frames are substantially perceptually indistinguishable. One embodiment uses algorithmic identification of such a sequence of frames, and another uses manual identification by a human operator of the sequence of frames.

Note that in commercial films, there are titles of the film, e.g., an announcement of the production company, or even the main titles of the film that are easy to judge as being formed by a plurality of identical frames by a human operator. Thus, manual identification to find a sequence of identical frames is typically straightforward for a human operator of video sequences.

In those embodiments that use an automatic (algorithmic) method to identify the identical or near identical, the automatic identifying method decoding the frames and using a creterion, such as that sum of the square of the differences for sequential macroblocks that are at the same location is less than a pre-selected threshold, to identify two macroblocks being identical or neat identical. Note that this operation typically would only need to be carrier out once for a movie. Furthermore, assuming the watermark is relatively small, only one identical sequence needs to be identified.

It is known that there are several different types of macroblocks possible in predictively encoded frames in standards such as the MPEG2 standard. For example, it is known that there are eleven different coded types of B-frame macroblocks, and a skipped type for a total of 12 different types. Furthermore, in the identified sequence, the predictively encoded frame, e.g., the B-frame of the identified frame sequence is known to be substantially identical to its reference frames. An aspect of the invention is to encode the watermark using a different type of predictively encoded frame macroblock type encodings, e.g., B-frame macroblock type encodings for a B-frame that is part of the identified frame sequence. Because using different macroblock types than in the original B-frame would lead to perceptually indistinguishable results, one can re-encode watermark information into macroblocks of B-frame in the identified sequence using any of the 11-possible coded macroblock types for a B-frame.

The method 100 thus further includes for the predictively encoded frame type of the identified sequence, in 105, creating an ordered set of macroblocks, with the macroblock types of different macroblocks in the ordered set used to encode digital watermark information. In the embodiment in which the identified sequence is a sequence containing a B-frame, the B-frame macroblock types are used to encode the digital watermark information.

Once a frame sequence of has been identified, the method 100 includes, in 107, replacing the predictively encoded frame(s), e.g., the B-frame(s) of the identified sequence with a newly-encoded predictively encoded replacement frame(s), e.g., replacement B-frame(s) that contain the created ordered set of macroblocks (from 105), including the encoded watermarking information. The encoding of the replacement frame(s) is such that the newly-encoded replacement frame(s) has the same size in bits as the predictively encoded frame being replaced. In one embodiment, bit stuffing is used to ensure the same frame size.

The encoding described herein is computationally simple. Further, the information added to the content may be modified at any time, e.g., when the content provider deems it necessary.

The 11 B-frame coded macroblock types are known in the MPEG2 standard as intra-d, intra-q for intraframe and intraframe scaled-quantizer coded macroblocks, respectively; pred-f, pred-fc, and pred-fcq for forward-predictive, forward predictive DCT'd, and forward predictive DCT'd and scaled-quantizer macroblocks, respectively; pred-b, pred-bc and pred-bcq for backward-predictive, backward predictive DCT'd, and backward predictive DCT'd and scaled-quantizer macroblocks, respectively; pred-i, pred-ic and pred-icq for bidirectionally-predictive, bidirectionally predictive DCT'd, and bidirectionally predictive DCT'd and scaled-quantizer macroblocks, respectively. One also can choose to skip the macroblock by incrementing the macroblock_address_increment of the following macroblock. macroblock_address_increment is used for relative macroblock addressing, according to the MPEG2 standard. This gives us 11 coded macroblock types and the skipped macroblock for a B-frame, which for a B-frame of the identified sequence, each appear identical or near identical. Table 1 summarizes the different B-frame encodings, and the code used to indicate the macroblock type.

TABLE 1

Macrocode types in B-frames

| Name | Code | Data sources |
|---|---|---|
| Bidir/Not Coded (pred-i) | 10 | Pred and succ frames |
| Bidir/Coded (pred-ic) | 11 | Pred and succ frames, DCT coefficients |
| Backw/Not Coded (pred-b) | 010 | Pred frame |
| Backward/Coded (pred-bc) | 011 | Pred frame, DCT coeff. |
| Forw/Not Coded (pred-f) | 0010 | Succ frame |
| Forward/Coded (pred-fc) | 0011 | Succ frame, DCT coeff |
| Intra (intra-d) | 00011 | DCT coeff only |
| Bidir/Coded/Quant (pred-icq) | 00010 | Pred and succ frames, DCT coeff, Quantizer |
| Forw/Coded/Quant (pred-fcq) | 000011 | Succ frame, DCT coeff, Quantizer |
| Backw/Coded/Quant (pred-bcq) | 0000 | Pred frame, DCT coeff, Quantizer |
| Intra/Quant (intra-d) | 000001 | DCT coeff, Quantizer |
| Skipped (the macroblock is identical to predecessor frame macroblock in same position) | | |

Note that the Intra (intra-d) and Intra/Quant (intra-q) types require providing potentially very long DCT coefficient lists which vary based on the input data in the frame. All the other type macroblocks typically can be coded as relatively short bit strings, that, because of being in a B-frame of the identified sequence, are substantially visually invariant with respect to the picture being encoded. Therefore, one embodiment avoids using the Intra and Intra/Quant macroblock types.

The Skipped macblock type is not the same as other types because instead of coding this macroblock in the bitstream, the macroblock_address_increment of the next coded block is incremented. The bit size in the stream is therefore very small, typically 0-1 bits due to the increase in size of the next macroblock_address_increment.

All other macroblock types of a B-frame can be represented as constant bit strings. Because the image of a macroblock of a B-frame of an identified sequence is invariant with respect to the picture being manipulated., one can choose to use either backward or forward references, in any combination, without affecting the picture.

FIG. 2A-2I show the bitstrings of each of the 11 macroblock types possible in a B-frame, together with the respective lengths in bits, and how each type's bitstring decomposes into substrings. The respective drawings also show the meaning of the component substrings.

It should be noted that the substring code for the coded_block_pattern is not critical. In the embodiment shown, the inventors chose a constant coded_block_pattern of 4 because then only DCT data for one block needs to be supplied. If more than one block is specified in the coded_block_pattern chosen, an additional '1010' substring for the dct_coeff_first/dct_coeff_next of the additional blocks may be added. This provides a method of adding even more digital information to the frame, as discussed below.

The choice of the MPEG quantizer control parameter quantizer_scale is arbitrary. Any number from 1-31 is acceptable. Because no actual DCT data is provided with any of the macroblocks in one embodiment, the quantizer_scale number is not used. The quantizer_scale field provides another mechanism for adding more digital information to the identified B-frame, as discussed below.

The macroblock representation choice does not affect the appearance of the frame. Thus, one aspect of the invention is encoding digital data into the B-frame of the selected sequence. The encoded digital data is in the form of the choice of B-frame type for each macroblock.

Figure 2A:
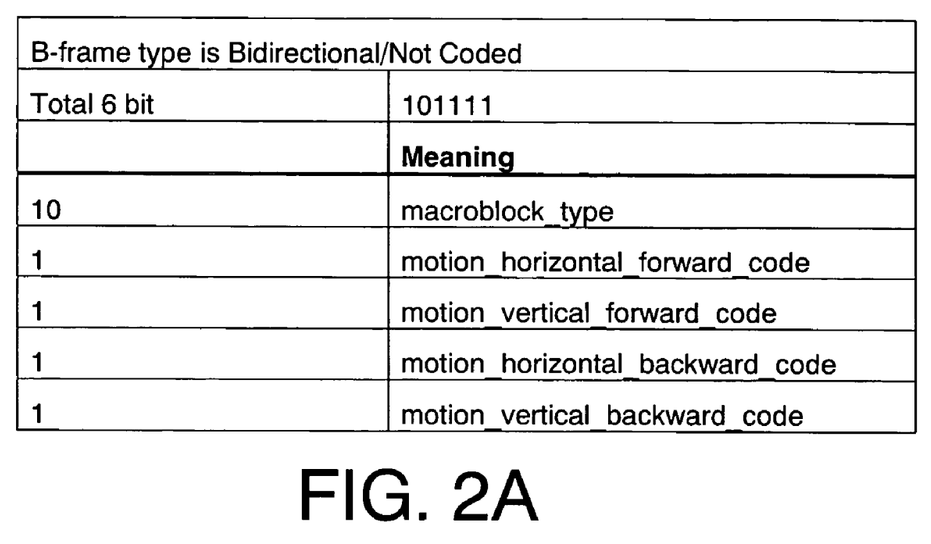
FIGS. 2A-2I show, in accordance with an aspect of the invention, the bitstrings of each of the 11 macroblock coded types possible in a B-frame, together with the respective lengths in bits, and how each type's bitstring decomposes into substrings.
Figure 2B:
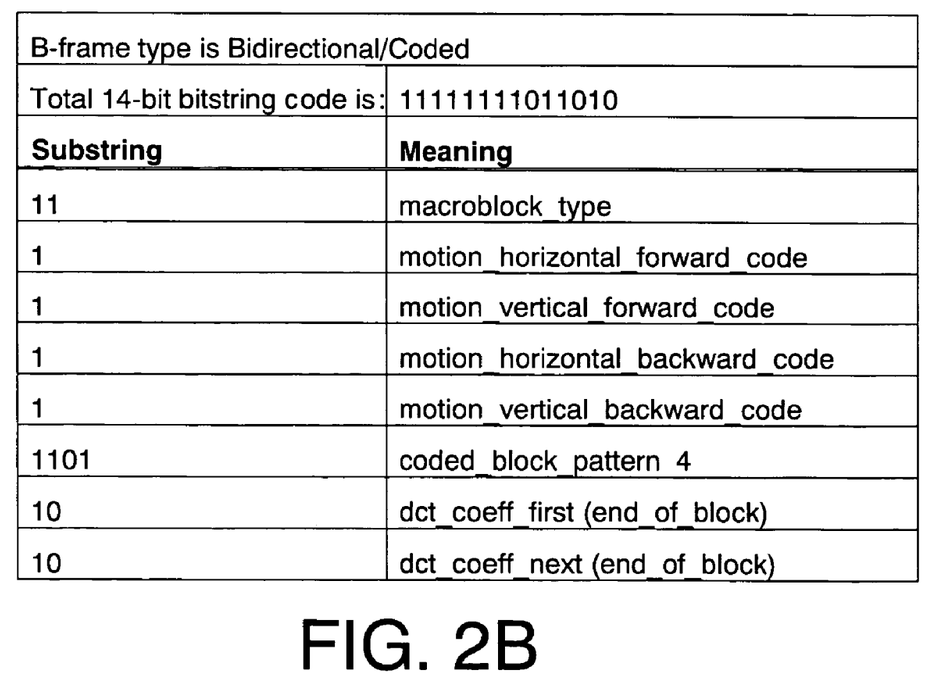
Figure 2C:
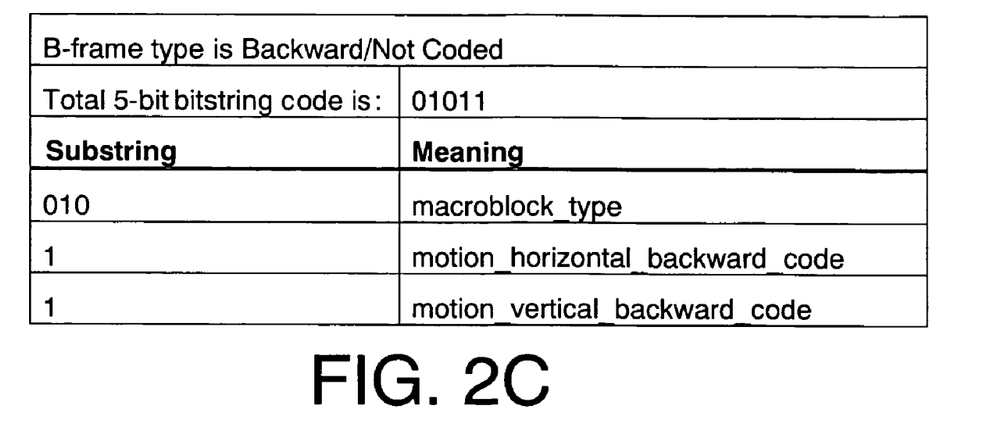
Figure 2D:
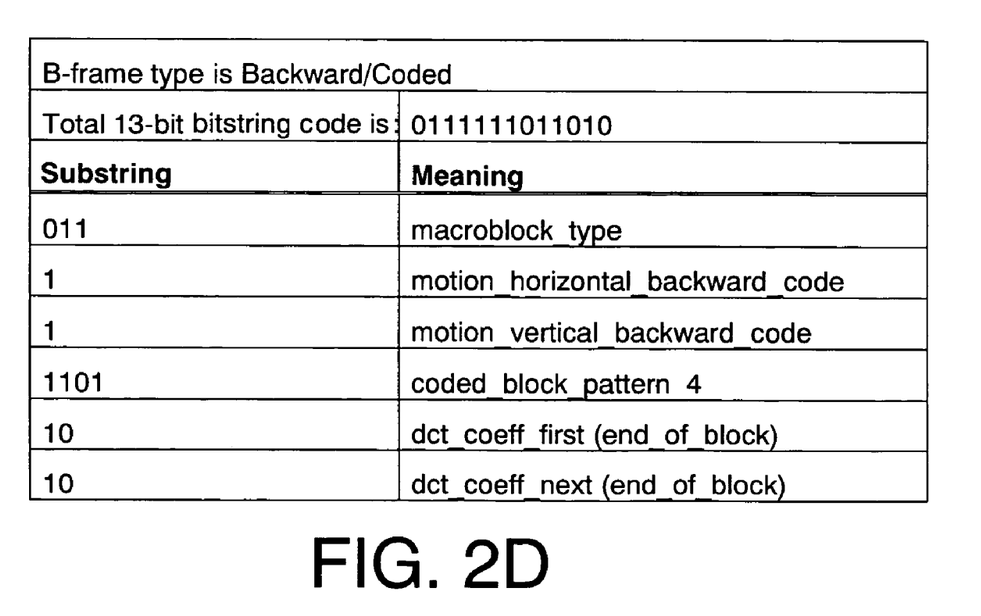
Figure 2E:
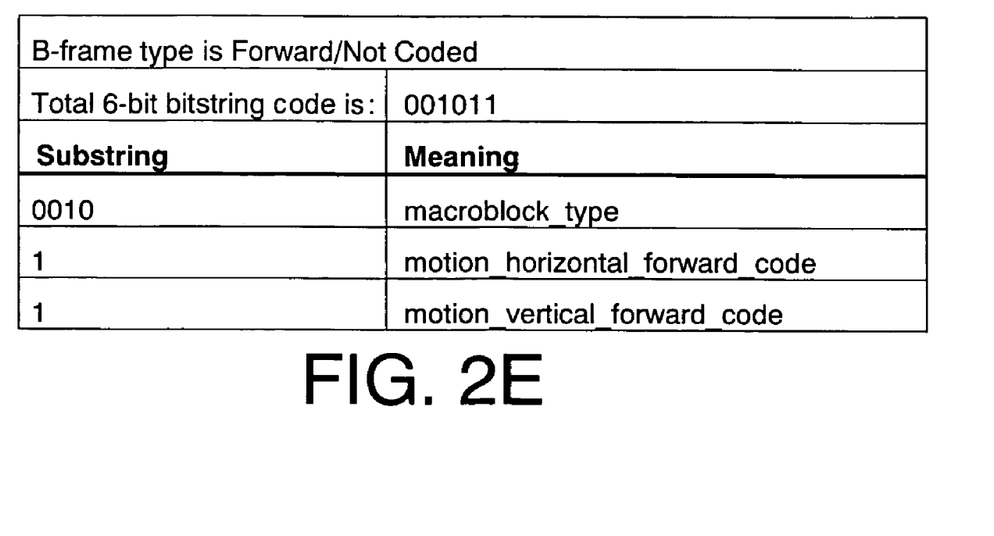
Figure 2F:
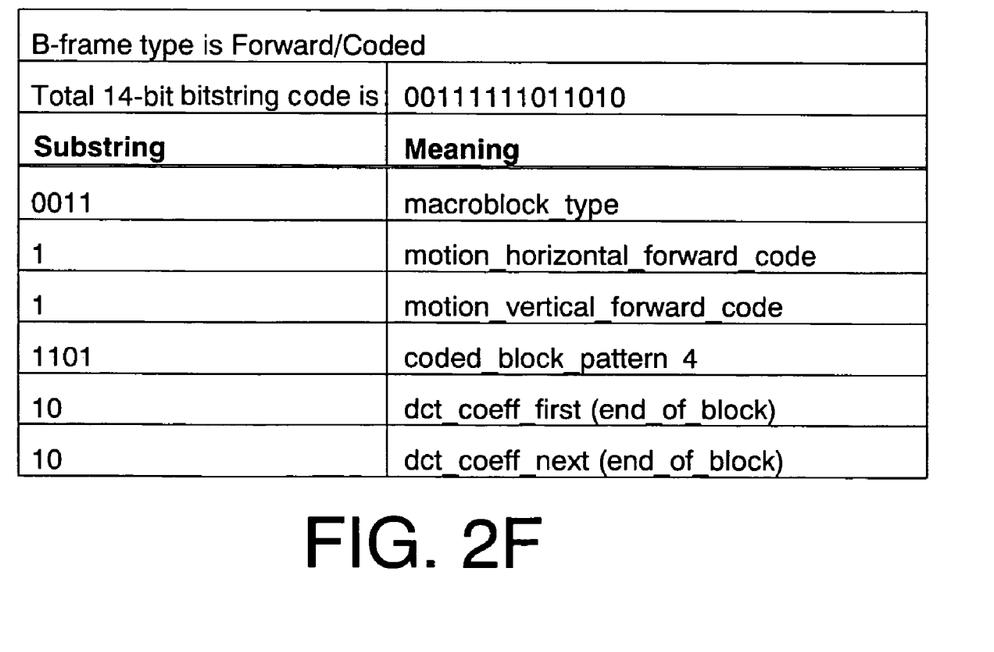
Figure 2G:
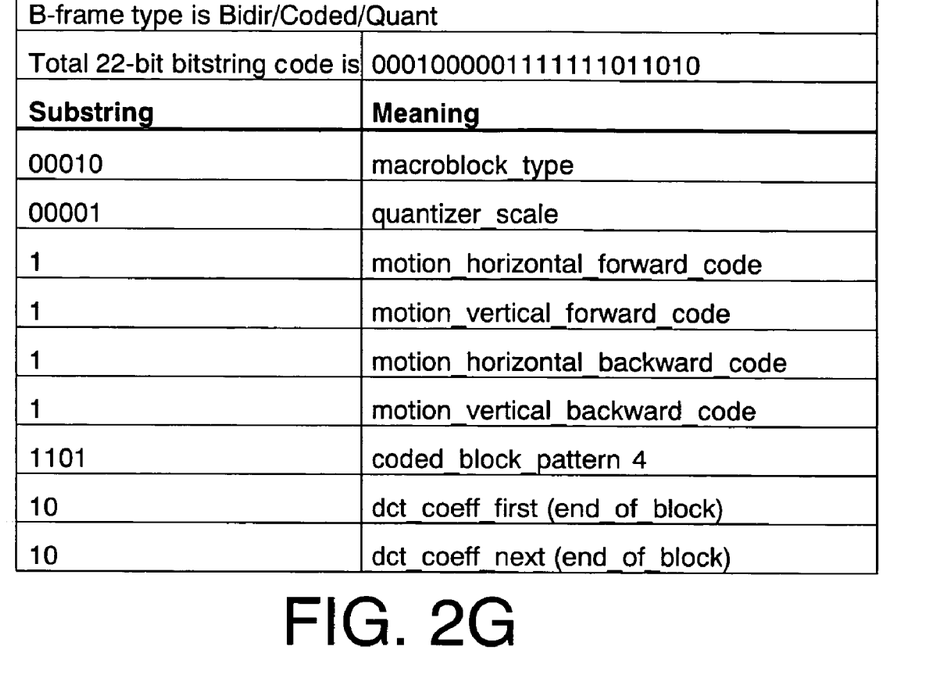
Figure 2H:
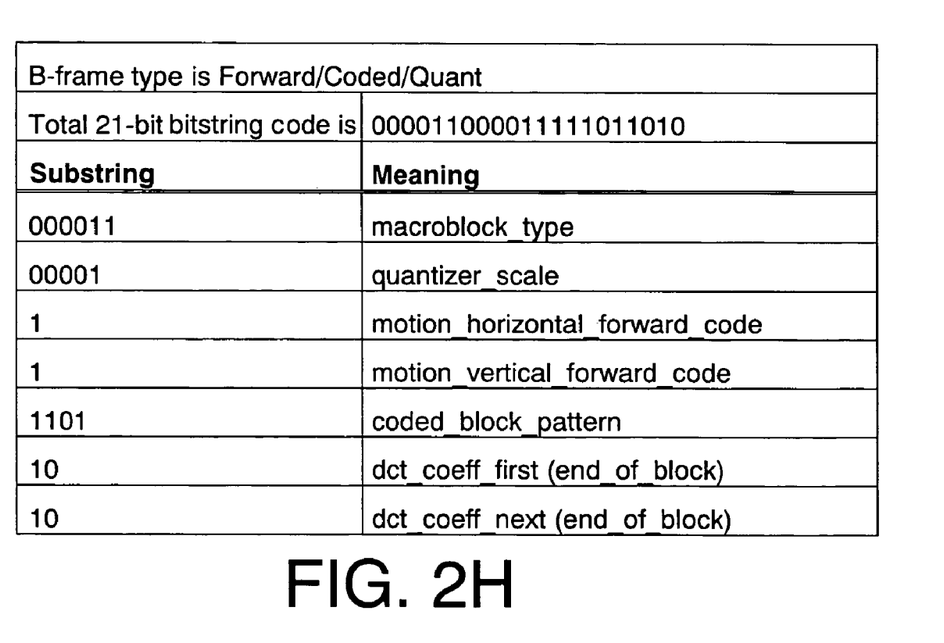
Figure 2I:
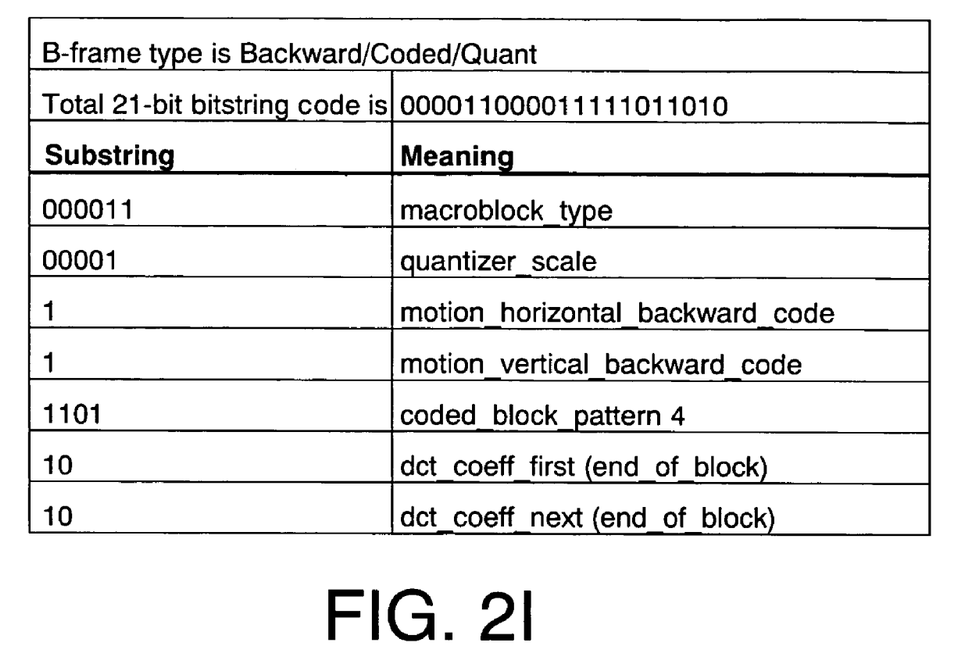

As a simple example, suppose a "1" in a data string to be encoded with a frame is encoded by encoding a macroblock as a "Backward/Not Coded" type macroblock using bitstring code 01011, and suppose a "0" in a data string to be encoded with a frame is encoded by encoding a macroblock as a "Forward/Not Coded" type macroblock using bitstring code 001011. One bit of the data string to be incorporated is then encoded by a respective B-frame macrocode in a B-frame of an identified sequence by coding successive macroblocks of the B-frame as one type or the other.

By using more than the two different macroblock types, more than one bit can be encoded into each macroblock of a B-frame of an identified frame sequence. Different embodiments use different encoding types and different values to represent the different types. In one embodiment, the Intra and Intra/Quant encoding types are avoided.

Yet other alternate embodiments provide even more data density by further modifying the encoding types of macroblocks of a B-frame of an identified sequence.

In one such alternate embodiment, the quantizer substring of "Forward/Coded/Quant", "Backward/Coded/Quant", and "Bidirectional/Coded/Quant" macroblock types is manipulated. Recall that no DCT data is provided, so an additional 4 to 5 bits of data are encoded in each of these quantizer-scale macroblock types, at the cost of slightly increased macroblock sizes.

For non intra type macroblocks, the fields macroblock_type and coded_block_pattern indicate whether a block has coefficient data transmitted for it. In one alternate embodiment that provides more data density, watermark data is encoded in the coded_block_pattern substring, with an additional '10' end_of_block element added to stub out the additional block definitions specified.

In another alternate embodiment, one or more of the macroblock stuffing elements, zero padding before slice start codes, the number of macroblocks in each slice, and the extra_data_slice fields are used to encode more digital data into the B-frame of the identified sequence.

Once the entire frame has been re-coded with the new macroblock types, one embodiment includes padding the B-frame with zero bytes until the size of the B-frame is the same as the original B-frame. The MPEG standard requires decoders to skip zero bytes until a picture_start_code has been reached.

A test computer program was developed that demonstrates the method using B-frames. The test program was able to deliver three bits of data per macroblock by using one of eight encoding types for each macroblock. For a SIF-sized 352×240 video stream that has 330 macroblocks per frame, this simplistic technique delivers 990 bits of data per B-frame, i.e., about 123 bytes. Thus, the newly encoded B-frames that are in a selected sequence of substantially visually indistinguishable frames are 15% to 25% of the size of the original B-frames, while encoding 990 bits of data for watermarking.

Note that in an alternate embodiment, the watermarking information is incorporated into only a portion of frames. That is, the identifying of a sequence of identical or near identical frames is replaced with identifying a sequence of frames wherein a proportion of each of the frames in the sequence is identical or near identical. The encoding is then into the macroblocks of the portion of the frames.

An alternate embodiment, which uses ten B-frame macroblock types, includes looking up a variable-length coded bit string table.

In theory, there are some syntactically valid frames in some syntactically valid streams for which the method will not be appropriate. For example, it is possible in theory to encode a B-frame with only one coded macroblock and a sufficiently high macroblock_address_increment. The encoding of the watermark described herein would then be larger than such a frame. However, the inventors do not know of any real-world encoders that actually produce such frames. Even then, for constant bitrate frames, the encoder would pad such frames, providing enough room for the encoding described herein.

While the above description is for encoding information into B-frames, according to an alternate embodiment, watermark information is encoded into P-frames that are part of an identified sequence that includes the preceding I-frame to the P-frames and that produces frames that are visually substantially identical.

Furthermore, the above description provides encoding watermark information into a video-only MPEG stream. If the video stream is embedded in a MPEG system stream, the bits representing the frame may be scattered into discontiguous areas in the system stream. However, since the replacement frame described herein that includes the watermark information is of the same length as the original frame being replaced, such a frame may be broken up and inserted into the stream by building a relocation list specifying where in the system stream each successive series of bytes from the frame belongs.

Another aspect of the invention is a method for reading the watermark information embedded into a media stream. Each B-frame that has been replaced is identified, and the information coded therein is decoded.

It should be appreciated that although the invention has been described in the context of the MPEG2 standard, the invention is not limited to such contexts and may be utilized in various other applications and systems, for example in other systems that use different macroblock types.

One embodiment of each of the methods described herein is in the form of a computer program that executes on a processing system, e.g., a one or more processors that are part of an MPEG gateway. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
accepting in a processing apparatus a compressed video stream that is compressed by a compression method that uses macroblocks for each frame, and that encodes some frames using predictive encoding based on one or more reference frames for each predictively encoded frame, and further, that uses different macroblock types for predictively encoded frames;
identifying by the processing apparatus a sequence of frames, at least a portion of which is substantially visually indistinguishable for each frame in the sequence, and that includes a predictively encoded frame and the at least one reference frame of the predictively encoded frame;
creating by the processing apparatus an ordered set of macroblocks, with the macroblock types of different macroblocks in the ordered set used to encode digital watermark information; and
replacing by the processing apparatus the at least a portion of the predictively encoded frame of the identified sequence with a newly-encoded predictively encoded replacement frame that contains the created ordered set of macroblocks in the position of the portion if only a portion is identified, including the encoded watermarking information, the encoding of the replacement frame in the replacing being such that the size of the newly-encoded replacement frame or portion of frame has the same size in bits as the predictively encoded frame or portion of frame being replaced,
such that the method transforms the compressed video stream into a compressed video stream that includes the encoded watermarking information.

2. A method as recited in claim 1, wherein the at least a portion is a complete frame, such that the identifying identifies a sequence of frames substantially visually indistinguishable that includes a predictively encoded frame and the at least one reference frame of the predictively encoded frame.

3. A method as recited in claim 2,
wherein the coding method uses bi-directional interpolated predictively encoded frames,
wherein the identifying is to identify a sequence containing a bi-directional interpolated predictively encoded frame and such frame's reference frames, and
wherein the macroblock types used to encode digital watermark information are macroblock types for bi-directional interpolated predictively encoded frames.

4. A method as recited in claim 2,
wherein the coding method uses bi-directional forward predictively encoded frames,
wherein the identifying is to identify a sequence containing a forward predictively encoded frame and such frame's previous reference frame, and
wherein the macroblock types used to encode digital watermark information are macroblock types for forward predictively encoded frames.

5. A method as recited in claim 2, wherein the coding method is MPEG2.

6. A computer-readable storage medium encoded with executable instructions that when executed by at least one processor in a processing apparatus, cause executing a method, the method comprising:
accepting in the processing apparatus a compressed video stream that is compressed by a compression method that uses macroblocks for each frame, and that encodes some frames using predictive encoding based on one or more reference frames for each predictively encoded frame, and further, that uses different macroblock types for predictively encoded frames;
identifying by the processing apparatus a sequence of frames, at least a portion of which is substantially visually indistinguishable for each frame in the sequence, and that includes a predictively encoded frame and the at least one reference frame of the predictively encoded frame;
creating by the processing apparatus an ordered set of macroblocks, with the macroblock types of different macroblocks in the ordered set used to encode digital watermark information; and
replacing by the processing apparatus the at least a portion of the predictively encoded frame of the identified sequence with a newly-encoded predictively encoded replacement frame that contains the created ordered set of macroblocks in the position of the portion if only a portion is identified, including the encoded watermarking information, the encoding of the replacement frame in the replacing being such that the size of the newly-encoded replacement frame or portion of frame has the same size in bits as the predictively encoded frame or portion of frame being replaced,
such that the method transforms the compressed video stream into a compressed video stream that includes the encoded watermarking information.

7. A computer-readable storage medium as recited in claim 6, wherein the at least a portion is a complete frame, such that the identifying identifies a sequence of frames substantially visually indistinguishable that includes a predictively encoded frame and the at least one reference frame of the predictively encoded frame.

8. A computer-readable storage medium as recited in claim 7,
wherein the coding method uses bi-directional interpolated predictively encoded frames,
wherein the identifying is to identify a sequence containing a bi-directional interpolated predictively encoded frame and such frame's reference frames, and
wherein the macroblock types used to encode digital watermark information are macroblock types for bi-directional interpolated predictively encoded frames.

9. A computer-readable storage medium as recited in claim 7,
wherein the coding method uses bi-directional forward predictively encoded frames,
wherein the identifying is to identify a sequence containing a forward predictively encoded frame and such frame's previous reference frame, and
wherein the macroblock types used to encode digital watermark information are macroblock types for forward predictively encoded frames.

10. An apparatus comprising:
means for accepting a compressed video stream that is compressed by a compression method that uses macroblocks for each frame, and that encodes some frames using predictive encoding based on one or more reference frames for each predictively encoded frame, and further, that uses different macroblock types for predictively encoded frames;
means for identifying a sequence of frames, at least a portion of which is substantially visually indistinguishable for each frame in the sequence, and that includes a predictively encoded frame and the at least one reference frame of the predictively encoded frame;
means for creating an ordered set of macroblocks, with the macroblock types of different macroblocks in the ordered set used to encode digital watermark information; and
means for replacing the at least a portion of the predictively encoded frame of the identified sequence with a newly-encoded predictively encoded replacement frame that contains the created ordered set of macroblocks in the position of the portion if only a portion is identified, including the encoded watermarking information, the encoding of the replacement frame in the replacing being such that the size of the newly-encoded replacement frame or portion of frame has the same size in bits as the predictively encoded frame or portion of frame being replaced,
such that the apparatus is configured to transform the compressed video stream into a compressed video stream that includes the encoded watermarking information.

11. An apparatus as recited in claim 10, wherein the at least a portion is a complete frame, such that the means for identifying identifies a sequence of frames substantially visually indistinguishable that includes a predictively encoded frame and the at least one reference frame of the predictively encoded frame.

12. An apparatus as recited in claim 11,
wherein the coding method uses bi-directional interpolated predictively encoded frames,
wherein the means for identifying is configured to identify a sequence containing a bi-directional interpolated predictively encoded frame and such frame's reference frames, and
wherein the macroblock types used to encode digital watermark information are macroblock types for bi-directional interpolated predictively encoded frames.

13. An apparatus as recited in claim 11,
wherein the coding method uses bi-directional forward predictively encoded frames,
wherein the means for identifying is configured to identify a sequence containing a forward predictively encoded frame and such frame's previous reference frame, and
wherein the macroblock types used to encode digital watermark information are macroblock types for forward predictively encoded frames.

14. An apparatus as recited in claim 11, wherein the coding method is MPEG2.

* * * * *